United States Patent [19]
Tan

[11] Patent Number: 5,941,124
[45] Date of Patent: Aug. 24, 1999

[54] FACE GEARING WITH CONICAL INVOLUTE PINION

[75] Inventor: Jie Tan, Mesa, Ariz.

[73] Assignee: McDonnell Douglas Corporation, St. Louis, Mo.

[21] Appl. No.: 09/054,484

[22] Filed: Apr. 3, 1998

[51] Int. Cl.[6] .................................................. F16H 55/18
[52] U.S. Cl. ............................. 74/409; 74/417; 74/459.5
[58] Field of Search .................................. 74/417, 459.5, 74/457, 462, 409, 410

[56] References Cited

U.S. PATENT DOCUMENTS

| | | | |
|---|---|---|---|
| 3,918,314 | 11/1975 | Osipyan | 74/459.5 |
| 5,116,173 | 5/1992 | Goldrich . | |
| 5,178,028 | 1/1993 | Bossler, Jr. . | |
| 5,807,202 | 9/1998 | Sammataro | 475/336 |

OTHER PUBLICATIONS

Dudley, Darle, Gear Handbook, McGraw–Hill Book Company, pp. 2–9 to 2–11, 1962.
Candee, Allan, Bevel Gears in Aircraft, Transactions of the A.S.M.E., p. 267, May, 1943.

*Primary Examiner*—John A. Jeffery
*Assistant Examiner*—David Fenstermacher
*Attorney, Agent, or Firm*—Westerlund & Powell, P.C.; Robert A. Westerlund; Raymond H.J. Powell, Jr.

[57] ABSTRACT

The present invention is directed to a unique gear set including a conical involute pinion and a mating face gear. The mating face gear has an axis whose location and orientation is usually configured, as intersecting with or slightly offset from the pinion axis. The pinion teeth are formed as involute helicoids generated from a base cylinder. The mating face gear teeth are defined by the shape of the mating conical pinion teeth surface at that time when the two mating gears are specifically positioned so as to perform synchronous rotations about their respective axes of rotation. This arrangement allows the gears to mesh and transmit high torque at high speeds through an angle as required in helicopter transmissions and the like.

12 Claims, 12 Drawing Sheets

FACE GEARING WITH CONICAL INVOLUTE PINION

BACKGROUND OF THE INVENTION

The present invention relates generally to gearing capable of providing torque and speed transmission through an angle as required in a helicopter transmission. In particular, the present invention relates to an angular gear drive employing a conical involute pinion, whose tooth surfaces are involute helicoids generated from a base cylinder, in mesh with a mating gear that is theoretically generated by the conical involute pinion.

A typical helicopter transmission includes a large total gear reduction ratio (in the magnitude of 70:1), one or two angular turns from the engine output to the main rotor and, preferably, some power splitting features for increasing the overall capacity within the specified weight and envelope limitations. These same requirements are also found in other applications.

In order to maximize performance of a helicopter, the gear sets comprising the drive train must be carefully selected. The performance of a gear set in transmitting power is judged in terms of, among others, the contact pattern imprinted on the teeth of each member as the members go through the mesh, the backlash of the mating teeth and the transmission errors or conjugacy of the mesh. The relative importance of these factors depends on the arrangement configuration and application requirements of the helicopter or other system driven by the gear set.

The present invention is concerned with gearing drives which transmit speed and torque through an angle. There currently exists a variety of gearing types which may be considered in attempting to accomplish this task. Configuration and efficiency considerations will exclude worm gears, spiroid gearing and helicon gearing from consideration in meeting the high-power intersecting shaft applications associated with helicopter transmissions. This leaves rather limited choices which are discussed below.

The spiral bevel gear set is a common gear arrangement employed in angular gear drives when high speed and high torque applications are desired. Spiral bevel gears have been found not to be suitable when there is a large reduction ratio (>5:1) combined with a large shaft angle resulting in a large pitch angle (>90°) in the gear. These limitations to the use of spiral bevel gearing are due to generation principles and manufacturing methods and are inherent in all spiral bevel gear sets. In addition, spiral bevel gearing is sensitive to establishing the proper contact pattern of the pinion (member with the fewer number of teeth) and the gear (member with the greater number of teeth). This makes it very difficult to adjust the backlash of a spiral bevel gear set without affecting the contact pattern. As a result, creating the proper backlash while retaining the proper contact pattern becomes a tedious, iterative process.

Another gearing type which may be considered are face gears. While this gear type was developed decades ago, it has only recently been considered for high-speed, high-power applications. Technology advancements in the areas of computer modeling and computer numerical control (CNC) machining makes it possible to understand and solve difficult problems in the design and manufacture of face gears such as complex 3D gear geometry, tooth contact analysis, avoidance of undercutting, face gear grinding and coordinate measurement of the tooth profile.

Face gears offer designers an alternative to spiral bevel gears in large shaft-angle, large reduction ratio angular power transmission environments. However, the backlash of conventional face gears can not be adjusted without adversely affecting the contact pattern or the conjugate action between the pinion and the gear. In the real world where manufacturing errors and loaded defections are inevitable, it is extremely difficult, if not impossible, to achieve both the desired contact pattern and the desired backlash during assembly. Maintaining proper tooth contact pattern is vital because the load capacity of a single mesh depends heavily on the proper location and orientation of the contact pattern. Likewise, the proper amount of backlash at each mesh is critical for torque-splitting because, as a closed-loop system, the timing among different power paths has significant impact on the percentage of power share through each power path.

Typical of the systems employing face gears in a helicopter transmission is that shown in U.S. Pat. No. 5,178,028 issued to Bossier, Jr. This patent teaches the use of two concentric, counter-rotating face gears, one being an idler gear and the other an output gear. The gears are in meshing engagement with a driving pinion connected to an engine output shaft. This system clearly does not contemplate the use of a conical involute gear as the pinion in mesh with a mating gear theoretically generated by the conical involute pinion.

In reviewing various types of gearing which could possibly meet the requirement of transmitting power through an angle, one might consider the so-called conical involute gears commonly known as BEVELOID gears, a registered trademark of the Invincible Gear Co., Livonia, Mich. Another name for this type of gearing include tapered involute gears. An advantage of this gearing is its insensitivity to positioning of both the pinion and gear members and its adjustable backlash without violating conjuate action. However, in order to achieve this advantage, conventional conical involute gearing include certain, inherent, drawbacks which make such gearing unsuitable for high power applications. In particular, the cone or taper angle must be relatively small (<10°) or the face width of the gear will be severely limited by pointing at the large end and undercutting at the small end. In addition, the two mating conical gears are always in convex-convex point contact which is a significant limitation on load carrying capacity. During operation of such a gear set, the high relative curvature at the point of contact causes high contact stresses and breaks down desirable lubrication conditions. This problem becomes significantly more serious when the shaft angle is in the range of 70° to 110°, which range constitutes a common shaft angle arrangement in helicopter transmissions.

There is a clear and present need for a type of gearing suitable for applications demanding large reduction ratio and large shaft-angle arrangements, while providing appropriate capacity to transmit an appreciable mount of power. Such a gear set should also have the capability of adjusting backlash without affecting the tooth contact pattern and true conjugate action. As will become evident, the present invention provides a unique type of gearing that fulfills all of these needs.

SUMMARY OF THE INVENTION

The present invention is directed to a unique gear set including a conical involute pinion and a mating face gear. The mating gear axis location and orientation is usually configured, according to typical helicopter transmission requirements, as intersecting with or slightly offset from the pinion axis with a shaft angle ranging from 70° to 110°. The pinion tooth surface is formed as an involute helicoid generated from a base cylinder. The mating gear tooth is defined as the conjugate surface to the pinion tooth, with the surface generated by the pinion tooth following the same relative motion as the two gears mesh to transmit power. In other words, the shape of the flank surfaces of the face gear are directly determined by the shape of the conical involute pinion teeth as they exist when the two gear members are relatively positioned so as to perform synchronous rotations about their respective axes of rotation. This assures that the flank surfaces of the gear teeth contact the corresponding flank surfaces of the mating pinion teeth along an instantaneous theoretical line of contact at every instant of the meshing cycle and thus follow true conjugate action during the entire meshing cycle.

Gearing constructed in accordance with the present invention provides numerous, distinct advantages as compared with known gear sets. Because the pinion is a conical involute gear with tapered tooth thickness, its positioning provides a means of adjusting the backlash of the gear set. The involute helicoid is generated from a base cylinder and, as a result, the axial movement of the pinion for purposes of adjusting backlash will not affect the contact pattern or conjugate action of the gear set. This feature of the present invention is not available with either spiral bevel gears or conventional face gears.

The gear sets of the present invention are especially suitable for large reduction ratios of approximately 4:1–10:1 and for large shaft angles of approximately 70° to 110°. Such arrangements result in a relatively small pinion pitch angle and a relatively large gear pitch angle. A small pinion pitch angle allows the design of the taper angle to be relatively small. This, in turn, relieves the limitations on the conical involute pinion in regard to pointing and undercutting. The mating gear will, because of the nature of the generation process, have some limitation in face width of the gear teeth. However, because the surface of the mating gear is generated by the pinion rather than as another conical involute gear, the mating gear does not suffer as severe a limitation on face width of the gear teeth as the limitations affecting conventional pairs of conical involute gears. This provides an obvious power advantage as compared to beveloid gearing in which both gear members are formed as conical involute gears. In addition, this assembly overcomes the inability of spiral bevel gears to provide large reduction ratios and large shaft angles.

A further distinct advantage of the present invention is the line contact condition between the pinion and gear members provides enhanced load capacity compared to the point contact created by beveloid gearing. In practice, optimal contact conditions tend to be obtained by slightly modifying (crowning) the pinion and/or mating gear tooth to absorb manufacturing errors and deflections arising under load conditions. When properly crowned, the gear set of the present invention can be expected to create a localized pattern under light load and, under full load, create a pattern that will develop i.e., spread out, to cover the tooth flank, thereby reducing contact stresses and increasing load capacity of the gear set.

The pinion of the present invention includes a conical involute gear generated with a tapered root and a tapered outer face which helps to reduce sliding at the corner point; which point is furthermost from the kinematic pitch line, thereby reducing the scoring probability at the point of contact. This structure provides an improvement over conventional face gears that employ straight involute pinions where the kinematic pitch cone runs along the diagonal of the gear tooth.

A further advantage of the present invention is the ease of assembly as compared to conventional face gears with straight cylindrical pinions. This is due to the tapered tooth thickness and cone shaped outer face of the pinion which makes axial assembly of the pinion easier, especially when there is small backlash. It is expected that repeated disassembly and re-assembly of the pinion during development of a gear box may occur without movement of the mating face gears.

Conventional spiral bevel gears wherein both gear members are of complex tooth surfaces are very expensive to manufacture because of the special requirements for machines and cutting tools. In comparison, the present invention is much simpler to manufacture because at least the pinion can be made with existing tooling on spur/helical gear, hobbing or grinding machines that need only be slightly modified.

BRIEF DESCRIPTION OF THE ATTACHED DRAWINGS

Figures 1A, 1B:
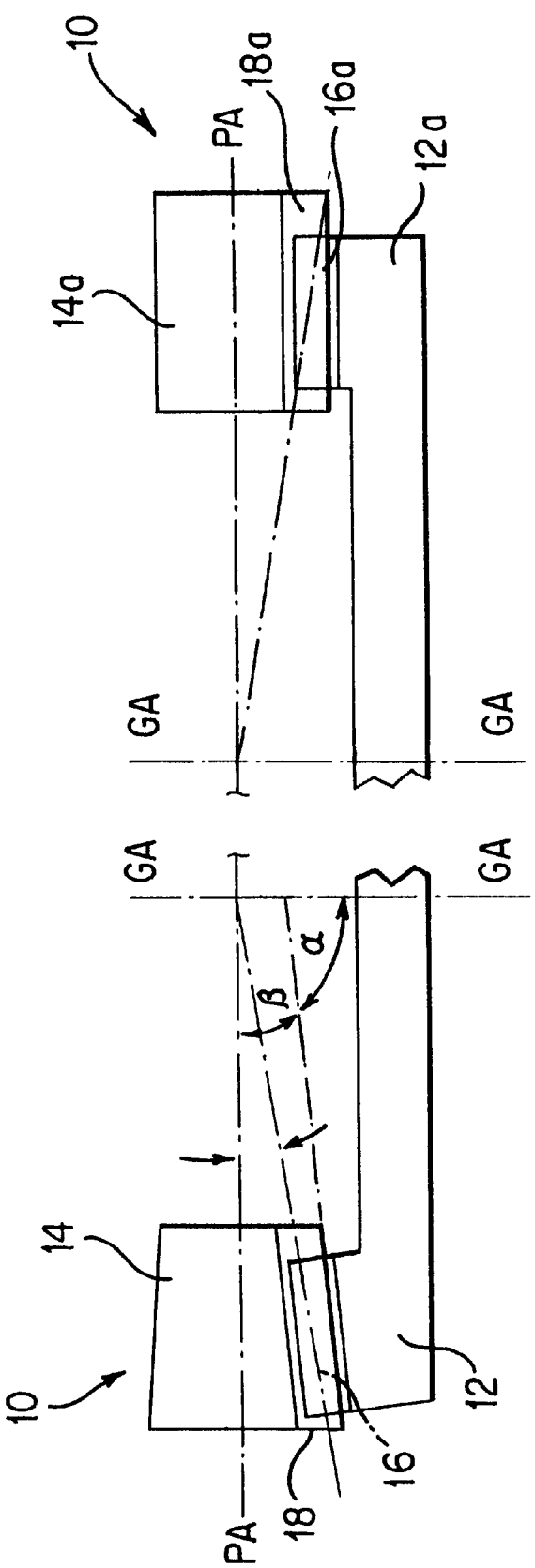
Figure 2A:
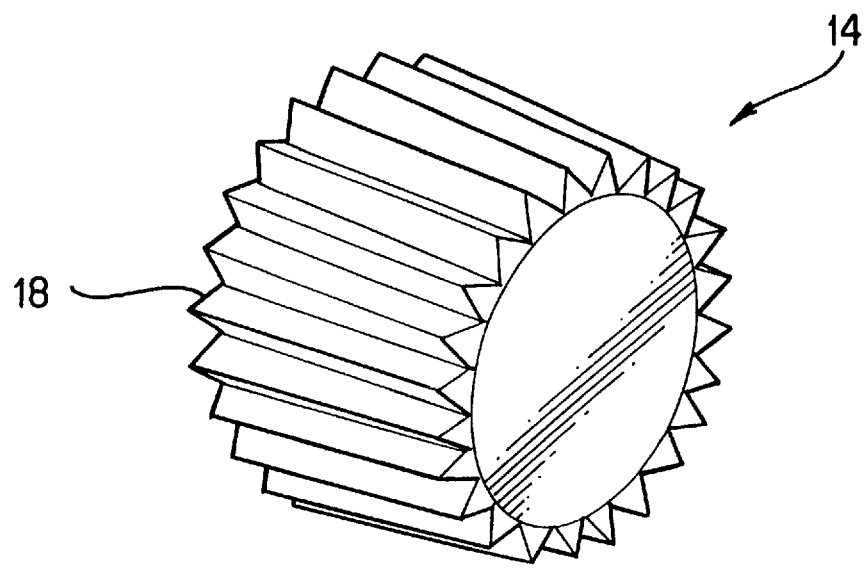
Figure 2B:
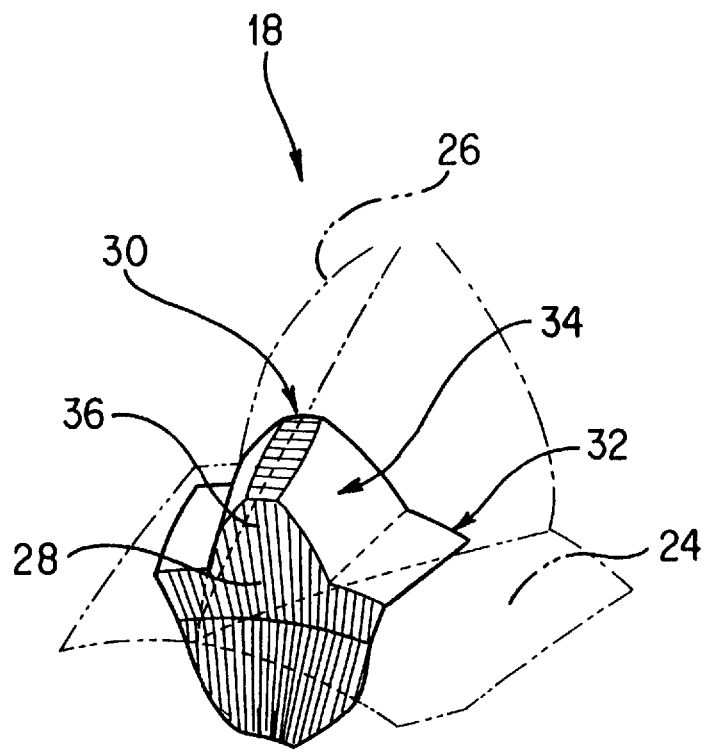
Figure 2C:
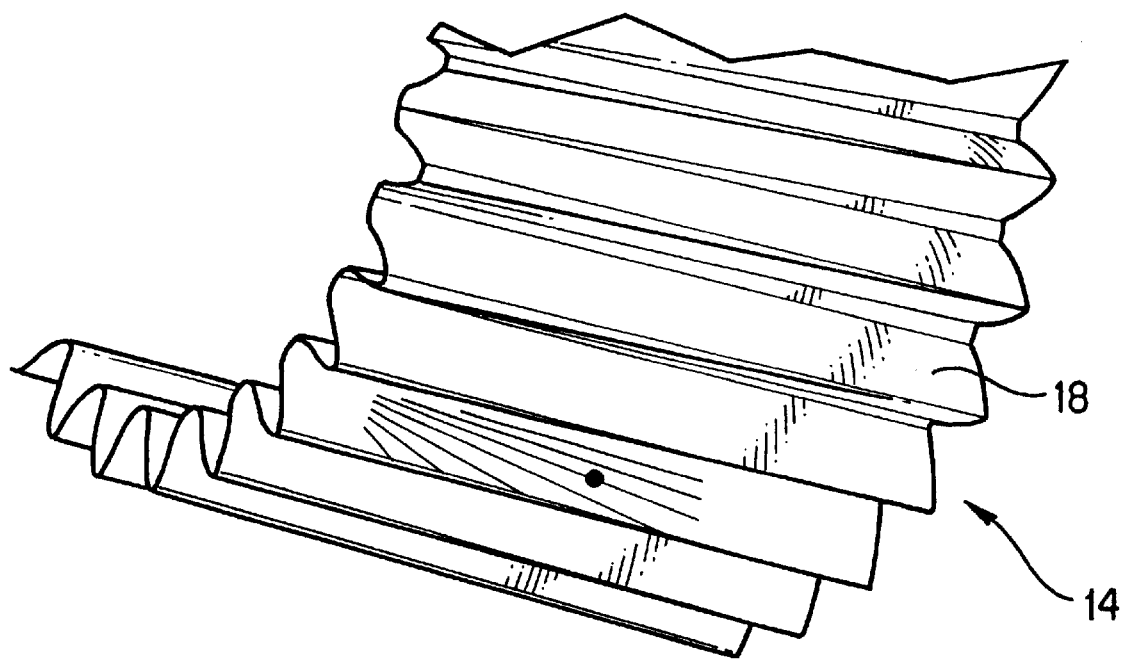
Figure 3:
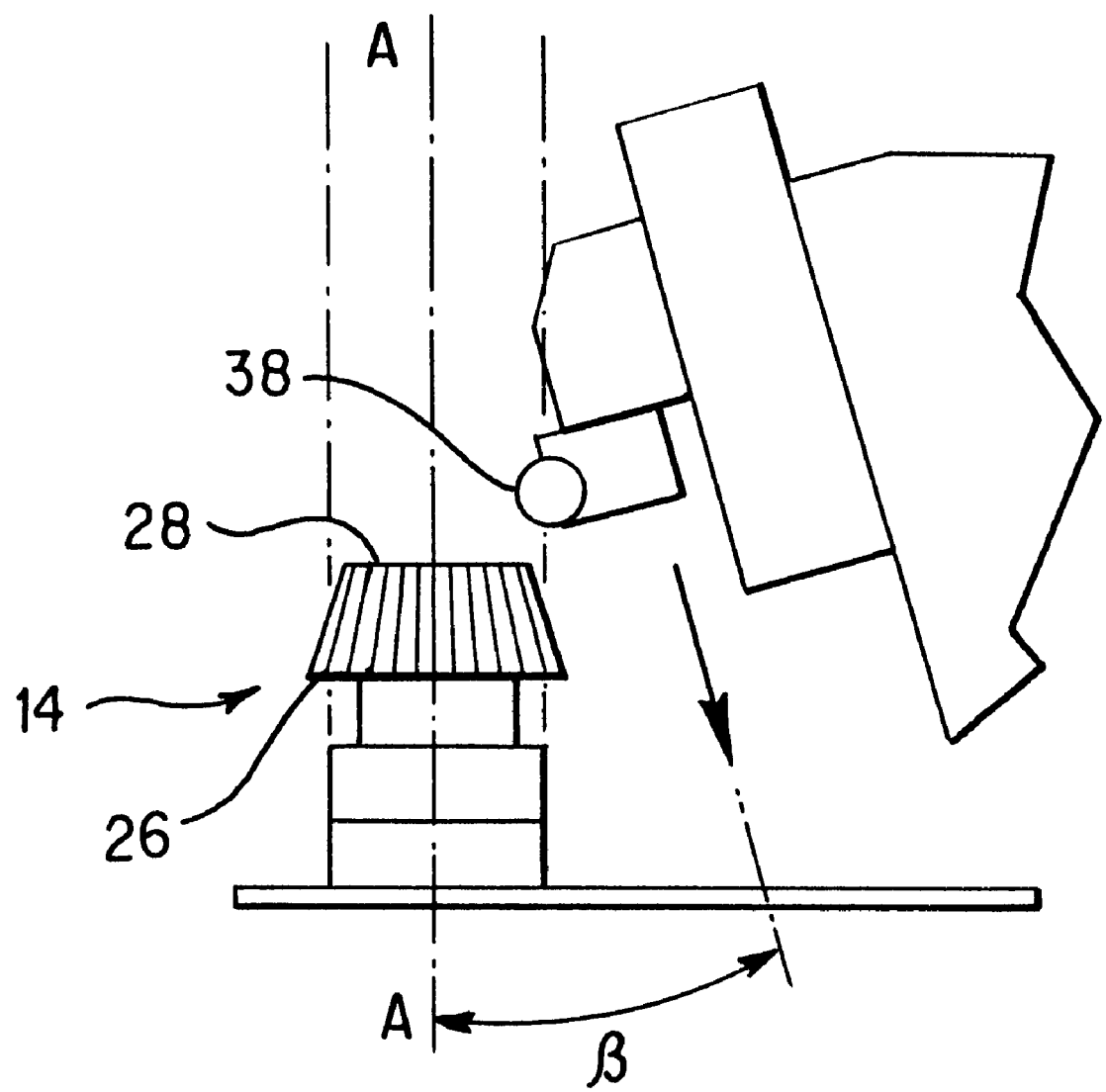
Figure 4A:
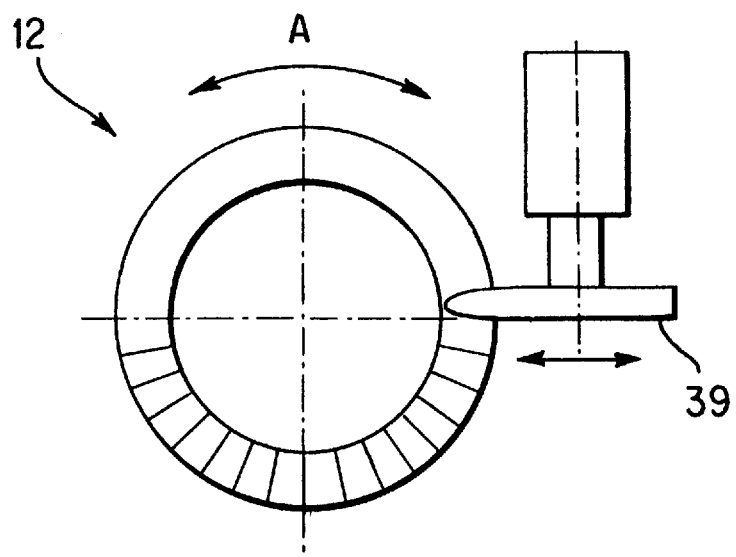
FIG. 4e is a perspective view of a face gear and a cutting tool adaptable for cutting one side of the face gear tooth profile.
FIG. 4f is a perspective view of a face gear and a cutting tool adaptable for cutting both sides of the face gear tooth profile.
Figure 4B:
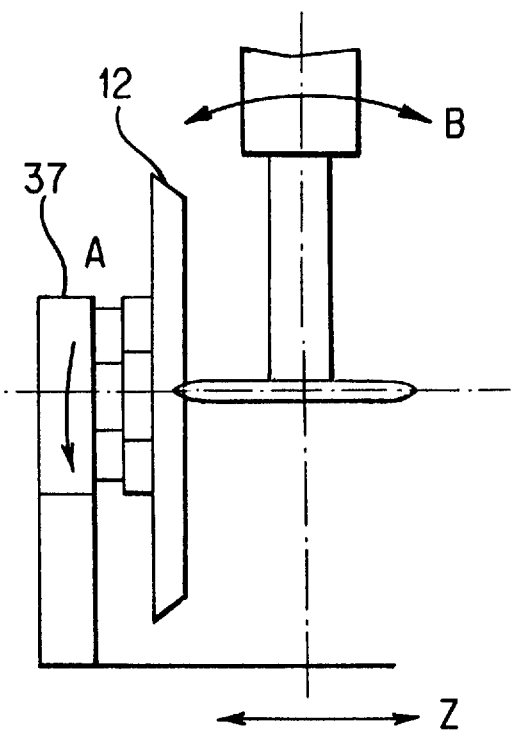
Figure 4C:
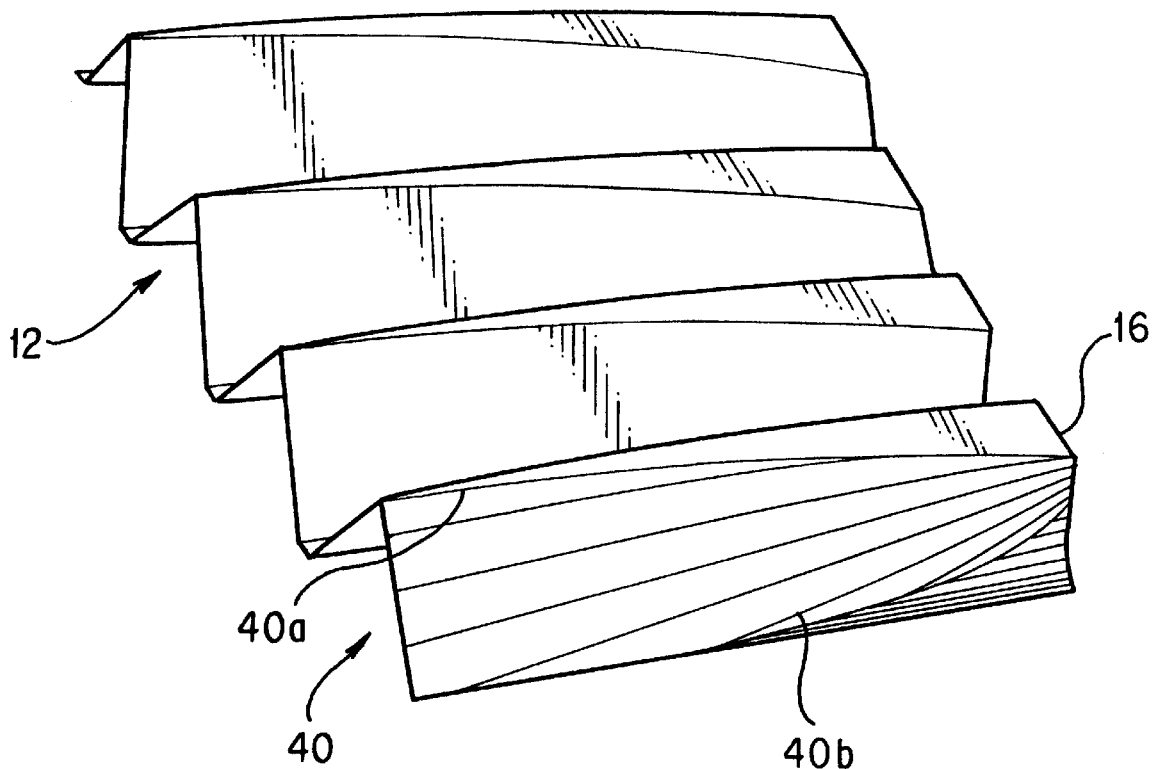
Figure 4D:
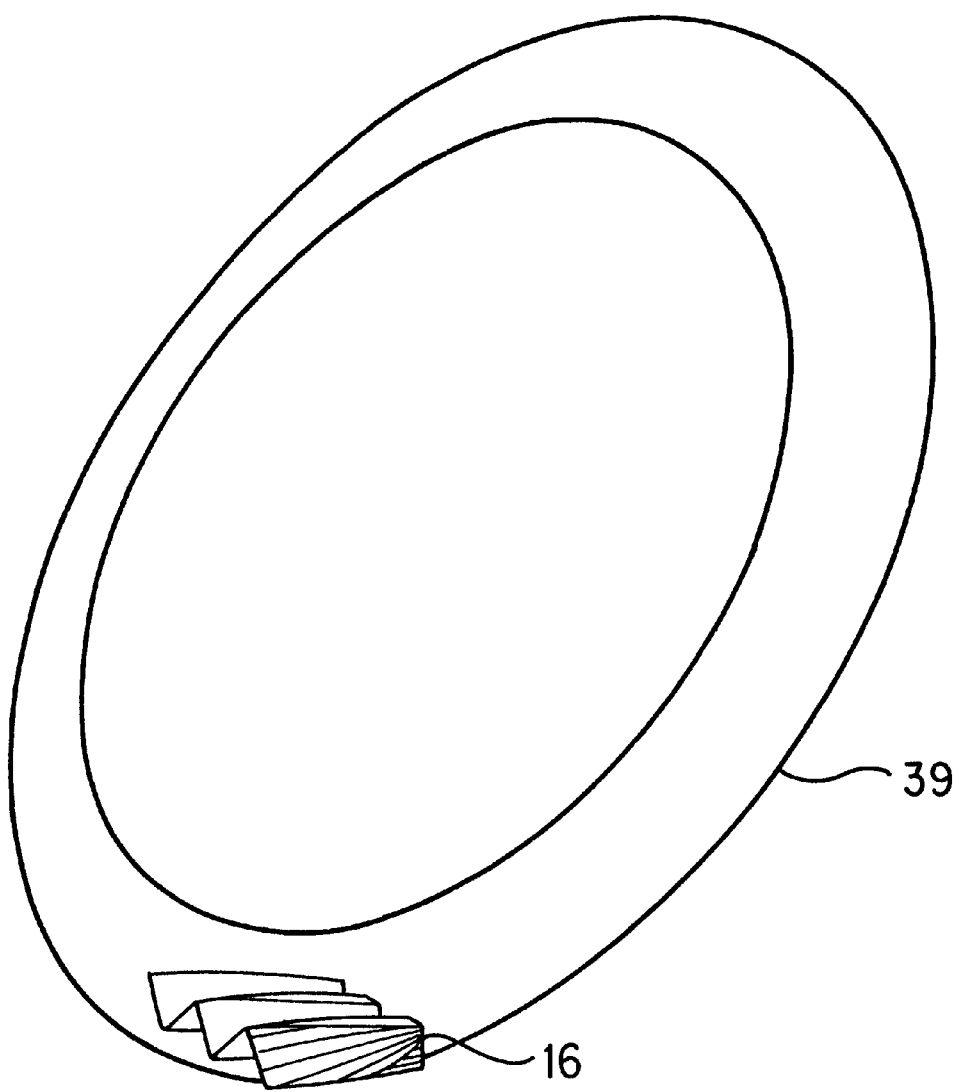
Figure 4E:
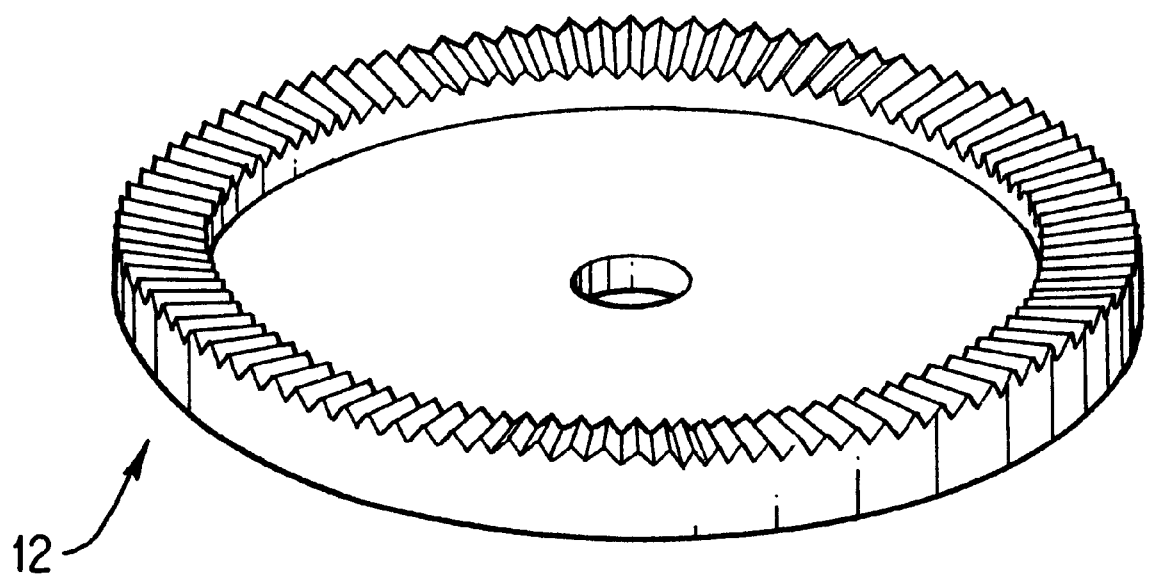
Figure 4F:
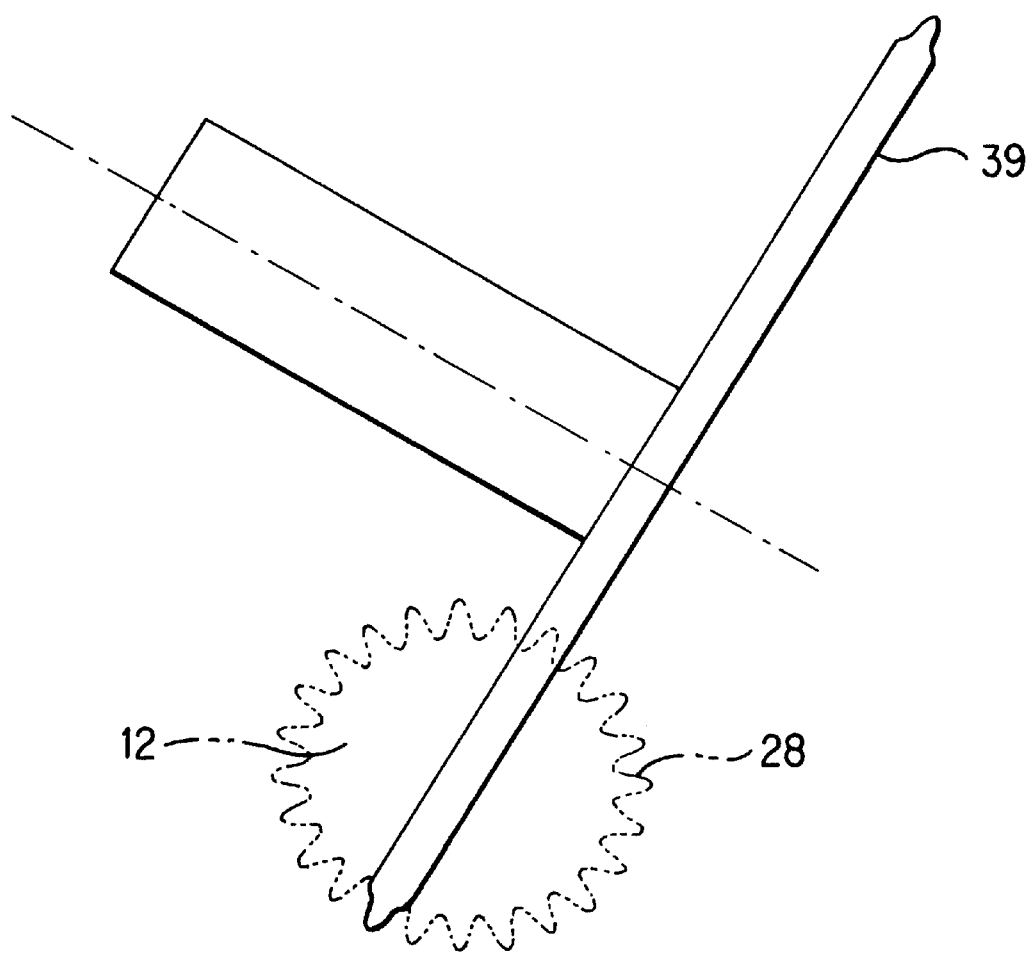
Figure 4G:
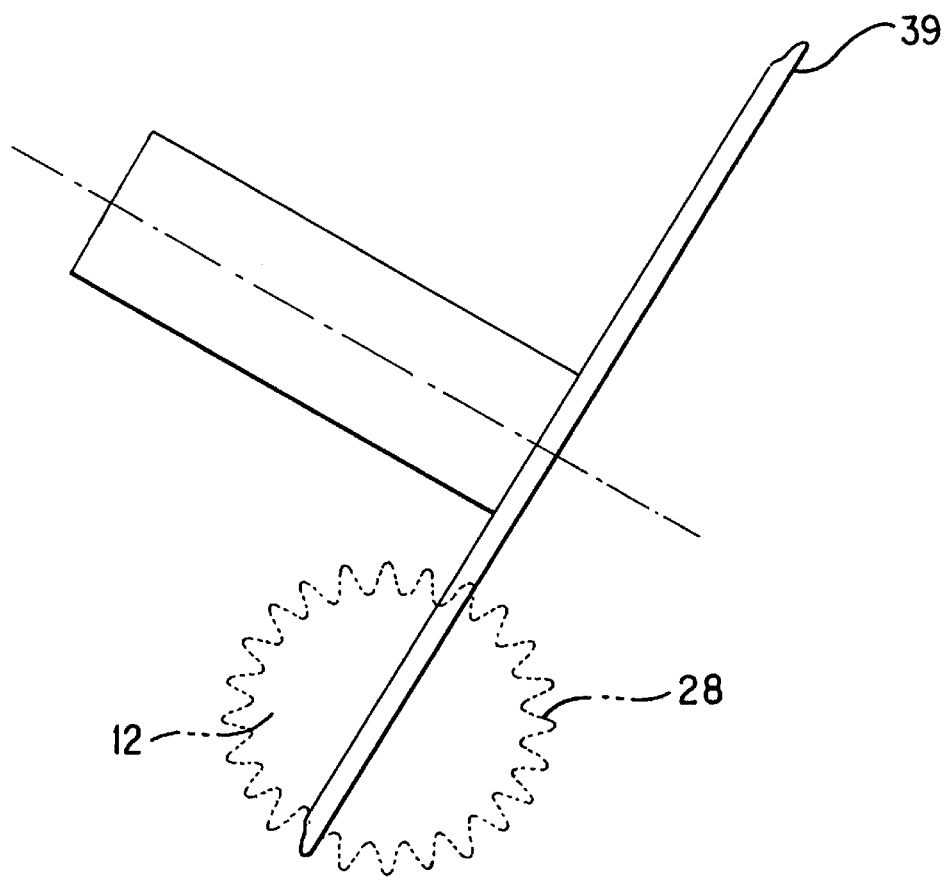

The foregoing and other objects, aspects and advantages will be better understood from the following detailed description of a preferred embodiment of the present invention with reference to the drawings, in which:

FIG. 1a is cross sectional view of a conventional, prior art, spur-pinion face gear;

FIG. 1b is cross sectional view of a tapered pinion-face gear assembly formed in accordance with the present invention;

FIG. 2a is a perspective view of a conical involute gear formed in accordance with the present invention;

FIG. 2b is a perspective view of an involute helicoid tooth in accordance with the present invention;

FIG. 2C is a perspective view of pinion tooth showing contact lines as created when in mesh with the mating gear in accordance with the present invention;

FIG. 3 is a perspective view of a conical involute pinion being generated in accordance with the present invention;

FIG. 4a is and end view of a machining configuration employed in fabrication of the mating face gear conjugate to the conical involute pinion shown in FIG. 2b;

FIG. 4b is a side view of the machining configuration of FIG. 4a;

FIG. 4c is a perspective view of the face gear tooth showing contact lines;

FIG. 4d is a perspective view of a cutting tool and face gear in normal contact as would occur during fabrication of the face gear;

FIG. 4e is a perspective view of the face gear formed in accordance with the present invention; and FIGS. 4f and 4g show the relative configuration between the cutting tool and the gear.

Figure 5A:
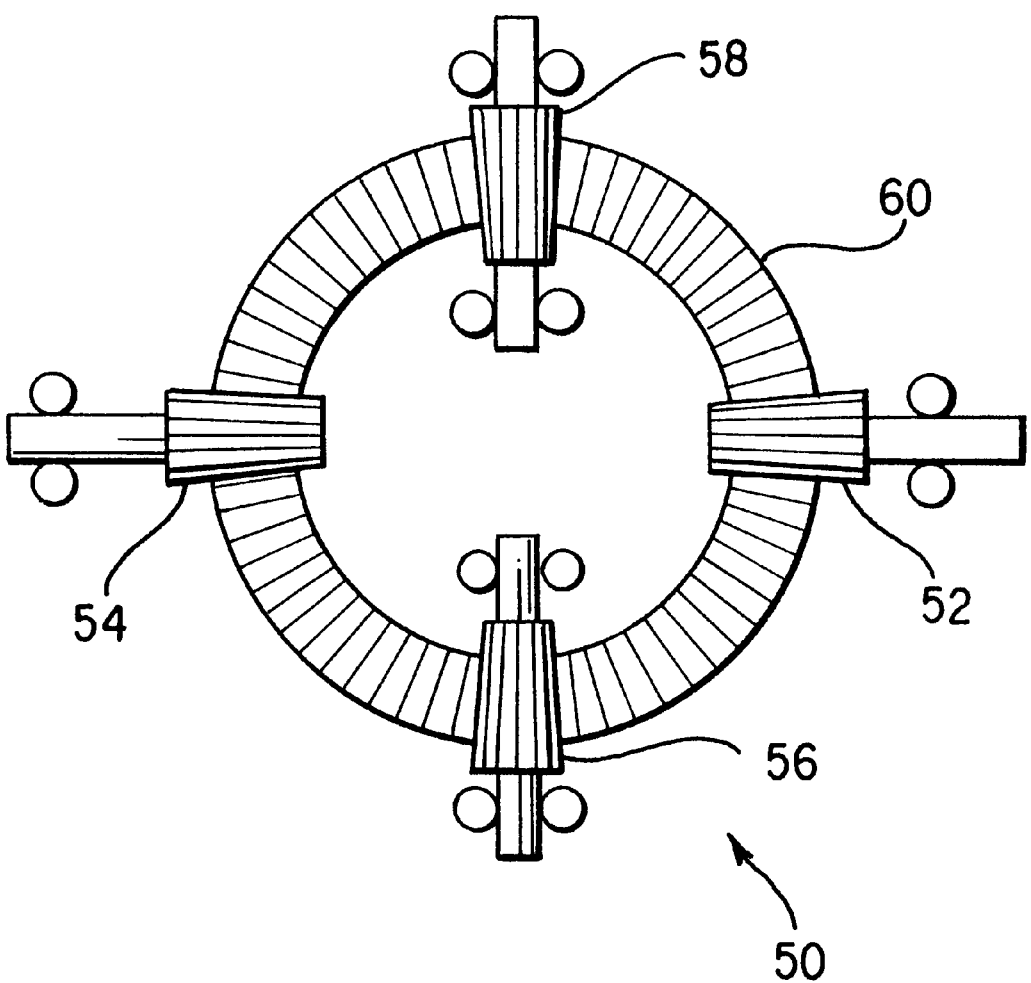
Figure 5B:
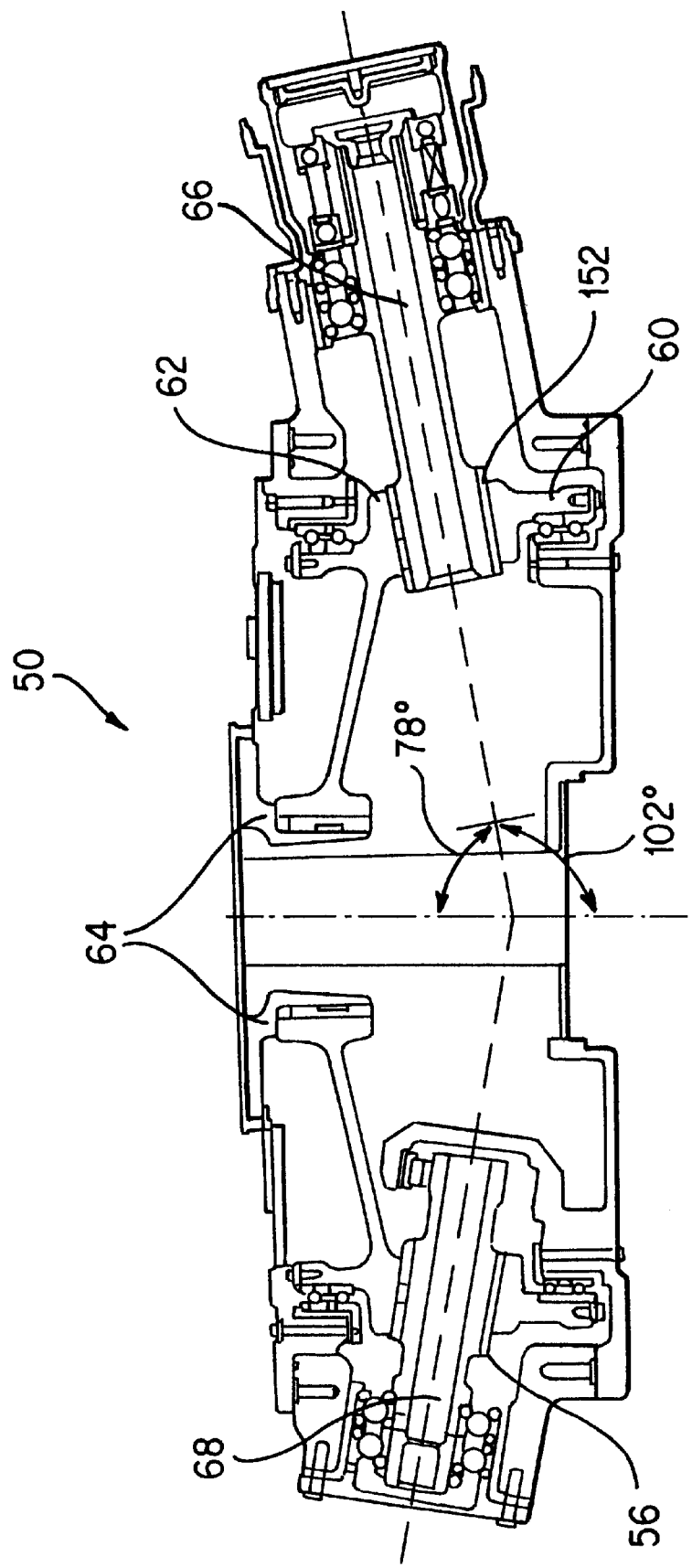

FIGS. 5a and 5b show top and sectional views, respectively, of a gear train including pinions and mating face gears formed in accordance with the present invention.

DETAILED DESCRIPTION OF THE INVENTION

While the present invention is described herein with reference to illustrative embodiments for particular applications, it should be understood that the present invention is not limited thereto. Those having ordinary skill in the art and access to the teachings provided herein will recognize additional modifications, applications, and embodiments within the scope thereof and additional fields in which the invention would be of significant utility.

Turning now to the drawings and to FIG. 1a, a conventional face gear set 10a is shown in FIG. 1a and comprises a pinion gear 14a and a mating gear 12a. It is noted that tooth 16a of gear 12a and meshing tooth 18a of pinion 14a each extends parallel to a pinion axis PA as well as extending parallel to one another.

In comparison, a unique face gear set 10 formed in accordance with the present invention is shown in FIG. 1b. Gear set 10 includes a pinion gear 14 and a mating gear 12. The tooth 16 formed on mating gear 12 forms a gear taper angle Ø to a gear axis GA. Likewise, the tooth 18 of pinion 14 forms a taper angle β with pinion axis PA. In comparison, the pinion 14a partially shown in FIG. 1a is generally referred to as a straight pinion while the pinion 14 in FIG. 1b is referred to as a conical or tapered pinion.

A pinion gear 14 formed in accordance with the present invention is shown in FIG. 2a. Pinion 14 includes a pinion tooth surface 18 which defines an involute helicoid as shown in FIG. 2b. Pinion tooth 18 includes a large end 26 and an oppositely disposed small end 28. Tooth 18 has a tapered outer cone 30 and a tapered root 32. Joining outer cone 30 to root 32 is an involute helicoid shaped surface 34. Finally, the small end 28 includes a dished or flat front surface 36.

The pinion 14 is a conical involute shaped gear with a tapered tooth thickness. This configuration provides a means of adjusting the backlash of gear set 10 without affecting the contact pattern or conjugate action of the gear set. The conical involute pinion 14 is especially suitable for large reduction ratios (4:1–10:1) in which cases the taper angle β can be kept small. While the taper angle Ø on the mating gear 12 is relatively large, the fact that mating gear 12 is generated by the pinion 14, rather than as being another conical involute gear, greatly reduces the limitations to face width as would otherwise occur if mating gear 12 were a conical involute gear similar to pinion 14. This provides a significant advantage over conventional BEVELOID gearing wherein both the pinion and mating gear are typically generated as conical involute gears.

For purposes of explanation, assume a conical face gear set in which the number of teeth on the pinion is $N_p$, the number of teeth on the gear is $N_g$, $\omega_p$ is the angular velocity of the pinion and $\omega_g$ is the angular velocity of the gear, thereby giving a reduction ratio of:

$$i_{pg} = \frac{\omega_p}{\omega_g} = \frac{N_g}{N_p}$$

The pinion can be produced by hobbing or generating grinding processes utilizing a threaded cutting/grinding tool in synchronous rotation with a pinion blank on which the teeth are to be generated. The process can be implemented on a conventional spur/helical involute gear hobbing machine or on a thread wheel grinding machine having an additional feature of feeding the tool across the face width of the pinion gear teeth along the direction that makes an angle β with the axis of the pinion as shown in FIG. 3. This angle β is a design parameter of the gear set 10. Hobbing and threaded-wheel grinding methods share the same principle of gear generation but usually produce gears of differing quality due to the differences in the methods of material removal. For aerospace applications such as use in a helicopter drive train, the preferred process is one wherein the pinion blank is first rough cut by hobbing to form the teeth. After this, the grinding process is employed to finish the teeth to a high degree of accuracy. The common machining practice is for the cutting tool 38 to start at the small end 28 of the conical involute pinion gear 14 as shown in FIG. 3 and perform the feed motion along the angle β with respect to the gear axis A—A until finally reaching the large end 26 of the pinion gear. This completes the tooth generation process for pinion 14. During the formation process, the cutting tool 38 and the pinion blank 14 perform synchronous rotations with the constant ratio determined by:

$$i_{pt} = \frac{\omega_p}{\omega_t} = \frac{N_t}{N_p}$$

where $N_t$ is the number of threads on the cutting tool 38, i.e., either a hob or a threaded grinding wheel and $\omega_t$ is the angular velocity of cutting tool 38.

FIGS. 4a and 4b illustrate the preferred method of fabricating mating gear 12 to be conjugate to the conical involute pinion 14 formed in accordance with the present invention. The cutting tool 39, either a peripheral milling cutter or a grinding disk, has its axial profile formed to match the tooth profile of the conical pinion at its small end 28. The axial profile of the cutting tool 39 can be formed either to be one side 41a of the tooth profile of the pinion 14, as it is shown in FIG. 4g, or the axial profile can be of both sides 41b of a pinion tooth as shown in FIG. 4f. Whichever of these two cutting tool designs 43a or 41b is used depends on the specifics of the machine on which the cutting method of the present invention is implemented. For example, if the cutting machine is of a type where the cutting tool 39 is intended to be turned over, that the profile 41a may be employed. However, if the tool 39 cannot be turned over, than the profile 41b assures that both flanks of the gear tooth may be formed. The particular type of cutting tool profile is not essential to the explanation of the formation of the face gear, because either tool finishes the face gear tooth one flank at a time. The diameter of the cutting tool 39 is designed to be reasonable from a practical standpoint and in itself makes up no part of the present invention.

As shown in FIG. 4a, face gear 12 is mounted on a rotary table 37. Rotary table 37 performs continuous, controlled rotary movement to provide required tangency conditions between the gear 12 and the cutting tool 39 as cutting tool 39 is traveling and cutting each tooth space across the face width of mating gear 12. After one tooth space is finished, rotary table 37 indexes gear 12 to the next tooth space and the cutting operation of tool 39 is repeated.

As cutting tool 39 moves across each tooth 16 formed on mating gear 12, the position and orientation of both cutting tool 39 and gear 12 are controlled so that the normal contact alignment between cutting tool 39 and the theoretical tooth surface 16 of gear 12 is maintained as shown in FIG. 4d. This normal contact position is derived from the conjugate action and the meshing condition between pinion 14 and mating gear 12. Application of the well known theory of gearing to the meshing process results in creation of a contact line (a 3D curve) between the pinion tooth 18 and the mating gear tooth 16 for every instant of the meshing cycle. Such contact lines 40 are shown in FIGS. 2c and 4c. This means that the whole active flank of both the pinion tooth 18 and the mating face gear tooth 16 is covered by an imaginary pattern of contact lines 40, each corresponding to a different instant, or different angle of rotation, of the meshing cycle between gear 12 and pinion 14. As a result, for a certain preset angle of rotation of mating gear 12 to be machined, there is a given contact line on the gear tooth and corresponding pinion tooth. In the course of the cutting tool 39 traveling across the mating gear tooth space at the predetermined angle of rotation of mating gear 12, the position and orientation of cutting tool 39 is controlled in such a manner as to satisfy the following operating conditions: (1) the cutting tool 39 is in instantaneous point contact with the mating gear 12 at a point on the specific contact line. This condition assumes both position and surface normal coincidence of the gear 12 and cutting tool 39 at their point of contact; (2) at each instant, the contact point on the cutting tool 39 is spaced a radial distance from the outer diameter of the cutting tool 39 equal to the distance of the corresponding theoretical point of contact on the mating pinion 14 to the outer diameter of pinion 14; and (3) as the cutting tool 39 moves along the face width of the mating gear 12, the point of contact between the gear and the cutting tool 39 moves along the contact line of the face gear 12 corresponding to the current angular position of face gear 12.

Reference is made to figure FIG. 4d which shows a typical position of a cutting tool 39 engaging gear 12 while satisfying the above conditions (1)–(3) existing during the process of machining gear 12. In particular, when generating a gear 12 in accordance with the present invention, the tangency conditions apply continuously to each theoretical contact line 40 on the gear tooth 16, preferably, starting from the contact line 40a near the top land of gear tooth 16 and finishing with the contact line 40b close to the root of tooth 16 as shown in FIGS. 4c and 4d. The number of theoretical contact lines 40 crossing the flank of gear tooth 16 during the machining process depends on accuracy requirements. For most applications, It is considered appropriate to have between 20–40 such theoretical contact lines 40 each extending across the flank of tooth 16. In forming a gear 12 according to the present invention, the method of fabrication finishes one flank of one gear tooth 16 at a time. The same flank of all gear teeth 16 are subsequently fabricated by rotating table 37 until each gear tooth 16 of gear 12 is subsequently aligned with the cutting tool 39 and the cutting process is repeated. It should be noted that both the rotary table 37 and cutting 39 may jointly move as cutting tool 39 crosses gear 12. The process controls the relative movement to assure that tool 39 follows each theoretical contact line 40. After the systematic cutting process for the same flank of each tooth 16 is finished, a similar cutting operation is then applied to the opposite flank of each tooth 16, one tooth at a time, until all the teeth 16 of gear 12 are formed.

In order to achieve the method of cutting gear 12 discussed hereabove, a multi-axis (5 or 6 axes) CNC machine providing a continuously controllable motion for cutting tool 39 and gear 12 may be employed. Several known machines are available in the gear manufacturing industry and the details of such machines themselves make up no part of the present invention. Typical of known CNC machines is the device described in U.S. Pat. No. 5,116,173 issued May 26, 1992 to Robert N Goldrich which disclosure is incorporated into the present application by express reference thereto. It should be emphasized that FIGS. 4a and 4b of the present application are only intended to show the relative configuration between the cutting tool 39 and the gear 12. The actual mounting configuration of a gear 12 and cutting tool 39 may vary depending on the design of the particular CNC machine employed.

The present invention can be utilized for high-speed, high torque gear drive applications having large reduction ratio and large shaft angle. Of particular benefit is the ability to adjust the backlash when employed in torque splitting designs in which it is critical that the proper amount of backlash at every mesh in different power flow branches be maintained. FIGS. 5a and 5b show a gear arrangement 50 in which the power from two input shafts is transmitted through an angle to one output shaft of the gear arrangement, with reduced speed and increased torque. Such an arrangement is provided as an example and is not intended to limit the present invention to any way. In a similar manner, the reduction gear ratio and angular relationships of the various shafts is provided solely for explanation and is not intended to limit the scope of the present invention.

Gear arrangement 50 includes a total of four pinions 52, 54, 56 and 58 and two face gears 60 and 62, including lower face gear 60 and upper face gear 62 forming eight separate meshes. At each mesh the reduction ratio may be designed to be approximately 8:1. The shaft angle may be selected to be 78° with the upper gear 62 and 102° with the lower gear 60.

Power input is taken from the two input pinions 52 and 54, which splits the power to the upper, output gear 62 and to the lower, idler gear 60 which is in concentric relationship with upper gear 62. The power taken by the lower gear 60 is transferred through the two idler pinions 56 and 58 to the upper output gear 62, which combines power from all four pinions 52, 54, 56 and 58 and delivers the power to an output shaft 64. With this gear arrangement 50, each gear mesh ideally sees only half of the load from one of two input shafts 66 and 68, or ¼ of the total output.

This arrangement allows the capacity of the transmission to be substantially increased for a given volume and defined envelope limitations. Such a torque-split combination gear arrangement essentially works as a closed-loop gear train, wherein the percentage of power shared in each load path depends on the angular timing of the gear members in each path, and the relative angular timing of the power paths is affected by the backlash at all meshes of each path combined. Even power-split among all meshes can not be achieved unless two conditions are present: (1) the two input pinions are mounted in floating shafts such that under actual load conditions they can find a balanced position at which equal torque is transferred to the upper and the lower mesh; and (2) the backlash at each mesh is properly set.

The effects of backlash are two-fold and include: (i) the relative backlash between the input pinion and the idler pinion determining how much the input pinion has to float or reposition itself to reach a balanced position under load condition when the load is split; and (ii) the relative backlash between the two idler pinions determining the percentage of the load transferred through each idler pinion and delivered to upper gear 62 and output shaft 64. If backlash amounts are not correctly determined and proper adjustment made, the input pinion may, in seeking a balanced position, run into the jamming condition by taking up all the backlash in one mesh, thereby preventing it from delivering equal amounts of torque to the upper and lower meshes. It is desirable that the backlash of each of the four pinions 52, 54, 56 and 58, either input or idler be individually adjustable to accommodate manufacturing errors and loaded deflections in order for the gear train 50 to properly function.

The present invention provides a unique gear set wherein the tooth surface 16 of mating gear 12 is conjugate to the involute helicoid tooth surface 18 of pinion 14. The gear tooth 16 is theoretically generated by pinion 14 following true conjugate action. When mating gear 12 is in mesh with pinion 14, line contact is created that will obey conjugate motion of transmission. The present invention includes the unique capability of providing an adjustable backlash through axial positioning of pinion 14 without affecting gear set contact characteristics or violating conjugate action. Such adjustment will not change the contact pattern, line contact condition or the true conjugate action of the gear mesh.

Although preferred embodiments of the present invention have been described in detail hereinabove, it should be clearly understood that many variations and/or modifications of the basic inventive concepts herein taught, which may appear to those skilled in the art, will still fall within the spirit and scope of the present invention as defined in the appended claims and their equivalents.

What is claimed is:

1. A gear set capable of meshing to transmit high torque at high speed through an angle, comprising:
    a conical involute pinion gear having a plurality of pinion teeth of similar shape to each other, with each pinion tooth having a pair of spaced-apart flank surfaces each formed as an involute helicoid;
    a mating face gear having a plurality of gear teeth of similar shape to each other, with each gear tooth having a pair of spaced-apart flank surfaces wherein the shape of the flank surfaces of the gear teeth are directly defined by the mating conical involute pinion tooth surfaces at the time when the two mating gear members are specifically positioned relative to one another so as to perform synchronous rotations about their respective axes of rotation, with the pinion gear having a taper angle relative to the pinion axis of rotation that is less than a taper angle of the face gear relative to the gear axis of rotation, whereby the flank surfaces of the face gear teeth contact the corresponding flank surfaces of the mating pinion gear along an instantaneous line of contact at every instant of the meshing cycle and follow true conjugate action during the whole meshing cycle.

2. The gear set of claim 1, wherein each tooth of the face gear is slightly crowned to absorb manufacturing errors and deflections arising under load conditions.

3. The gear set of claim 1, wherein each tooth of the pinion gear is slightly crowned to absorb manufacturing errors and deflections arising under load conditions.

4. The gear set of claim 1, wherein each tooth of the pinion gear has a tapered tooth thickness to allow adjustment of backlash in the gear set without affecting contact or conjugate action of the gear set.

5. The gear set of claim 1, wherein each tooth of the pinion gear includes a large end and a small end with a tapered outer cone and a tapered root extending between the large and small ends and an involute helicoid-shaped surface joining the outer cone and the tapered root.

6. The gear set of claim 1, wherein the pinion and face gear have axes of rotation forming an angle ranging substantially from 70° to 110° to one another.

7. The gear set of claim 6, wherein the teeth of the pinion and the teeth of the face gear mesh to create a gear reduction ratio of approximately 4:1–10.1,.

8. An high torque and high speed helicopter transmission gear arrangement, comprising:
    an arrangement of pinion gears, with each pinion gear formed as a conical involute pinion having a plurality of teeth of similar shape t each other, with each pinion tooth having opposite flank surfaces formed as an involute helicoid;
    at least two face gears positioned on opposite sides of the arrangement of conical involute pinion gears, with each face gear having a plurality of teeth of similar shape to each other, so that each face gear tooth has opposite flank surfaces defined by mating conical involute pinion tooth surfaces at the time when the mating conical involute pinion and face gear members are specifically positioned relative to one another so as to perform synchronous rotations about their respective axes of rotation, with the pinion having a taper angle relative to the pinion axes of rotation that is less than a taper angle of the face gear relative to the gear axis of rotation;
    wherein the flank surfaces of the face gear teeth contact the corresponding flank surfaces of the mating conical involute pinion along an instantaneous line of contact at every instant of the meshing cycle, and
    wherein the conical involute pinion gears and face gears are further disposed relative to one another in such a manner as to split power between the pinion gears.

9. The improved gear arrangement of claim 8, further including means for transferring an equal amount of power between each conical involute pinion and meshing face gear.

10. The gear arrangement of claim 9, wherein the means for transmitting an equal amount of torque comprises having certain of the pinions serve as input pinions mounted on floating shafts such that under actual load conditions the input pinions find a naturally balanced position wherein torque is transmitted equally to each mesh, and having the backlash at each mesh set to accommodate manufacturing errors and loaded deflections.

11. The gear arrangement of claim 10, wherein four pinion gears are positioned to form eight meshes with two face gears, wherein each mesh has a reduction ratio of approximately 8:1.

12. The gear arrangement of claim 11, wherein a shaft angle between the rotary axes each of the pinions and rotary axis one of the face gears is approximately 78° and a shaft angle between the rotary axes each of the pinions and the rotary axis of the other, oppositely disposed face gear is approximately 102°.

* * * * *